United States Patent [19]

Farrell et al.

[11] 4,407,897

[45] Oct. 4, 1983

[54] DRYING AGENT IN MULTI-LAYER POLYMERIC STRUCTURE

[75] Inventors: Christopher J. Farrell, Arlington Heights; Boh C. Tsai, Rolling Meadows; James A. Wachtel, Buffalo Grove, all of Ill.

[73] Assignee: American Can Company, Greenwich, Conn.

[21] Appl. No.: 101,703

[22] Filed: Dec. 10, 1979

[51] Int. Cl.³ .................... B32B 9/00; B32B 27/18
[52] U.S. Cl. ..................... 428/516; 252/194; 206/204; 206/524.5; 426/127; 428/35; 428/500; 428/688; 428/689
[58] Field of Search ........... 428/520, 35, 500, 516, 428/701, 689, 688; 426/127, 124, 415; 252/194; 206/204, 524.5

[56] References Cited

U.S. PATENT DOCUMENTS

| | | | |
|---|---|---|---|
| 2,772,172 | 11/1956 | Carson | 426/415 |
| 3,524,795 | 8/1970 | Peterson et al. | 156/244.11 |
| 3,560,325 | 2/1971 | Sogi et al. | 428/516 |
| 3,882,259 | 5/1975 | Nohara et al. | 428/35 |
| 3,908,070 | 9/1975 | Marzolf | 426/127 |
| 4,036,360 | 7/1977 | Deffeyes | 206/204 |
| 4,041,209 | 8/1977 | Scholle | 428/500 |
| 4,048,361 | 5/1978 | Valyi | 264/97 |
| 4,064,296 | 12/1977 | Bornstein et al. | 428/35 |
| 4,079,152 | 3/1978 | Bedrosian et al. | 426/415 |
| 4,079,850 | 3/1978 | Suzuki et al. | 428/516 |
| 4,092,361 | 5/1978 | Valyi | 264/97 |
| 4,124,116 | 11/1978 | McCabe | 206/204 |
| 4,239,826 | 12/1980 | Knott et al. | 428/522 |

FOREIGN PATENT DOCUMENTS 51-23919 3/1976 Japan.
1199843 7/1970 United Kingdom.

Primary Examiner—George F. Lesmes
Assistant Examiner—E. Rollins Buffalow
Attorney, Agent, or Firm—Paul R. Audet; Stanley L. Amberg

[57] ABSTRACT

In a multi-layer polymeric structure having an interior oxygen barrier layer of a moisture sensitive polymeric material such as ethylene-vinyl alcohol, drying agents are incorporated in the structure, particularly in a layer or layers proximate to the barrier layer, to limit the moisture content of the barrier layer to maintain barrier properties.

75 Claims, 7 Drawing Figures

4,407,897

DRYING AGENT IN MULTI-LAYER POLYMERIC STRUCTURE

BACKGROUND

Multi-layer polymeric structures are suitable for flexible and for rigid packages for food. Flexible multi-layer films are used for pouches, bags, and wraps. Thicker multi-layer structures can be formed into containers in the shapes and sizes common for metal cans. Sufficient impermeability to oxygen throughout the expected storage life of the packaged product is a necessity. Most economically practical polymers suitable for packaging purposes are relatively poor oxygen barriers. Consequently, an interior layer of a polymer impermeable to oxygen is desired. Among the favored candidate polymers for barrier layers are ethylene-vinyl alcohol (EVOH) and polyvinyl alcohol (PVOH). Both are excellent oxygen barriers, but both are quite moisture sensitive. Above a relatively modest moisture content, both rapidly begin to lose oxygen barrier quality. There are several opportunities for intrusion of moisture into the barrier layer from the packaged food itself, from storage in moist air and from water vapor present in commercial sterilization processes.

DESCRIPTION OF PREFERRED EMBODIMENTS

Vinyl alcohol polymers and copolymers are excellent oxygen barrier materials.

Substantially fully hydrolyzed ethylene-vinyl alcohol copolymers (EVOH) have rheological properties which allow them to be coextruded with common packaging polymers, thus making EVOH a preferred polymeric material for use as an oxygen barrier layer in rigid and flexible multi-layer polymeric structures for packaging. EVOH is a relatively expensive polymer, costing as much as eight times the cost of polymers commonly used in packaging. The cost of EVOH dictates the use of a very thin layer. A layer of dry EVOH less than one one-thousandth of an inch (1 mil) can provide sufficient protection from oxygen to permit storage of some foods for more than one year.

Figure 1:
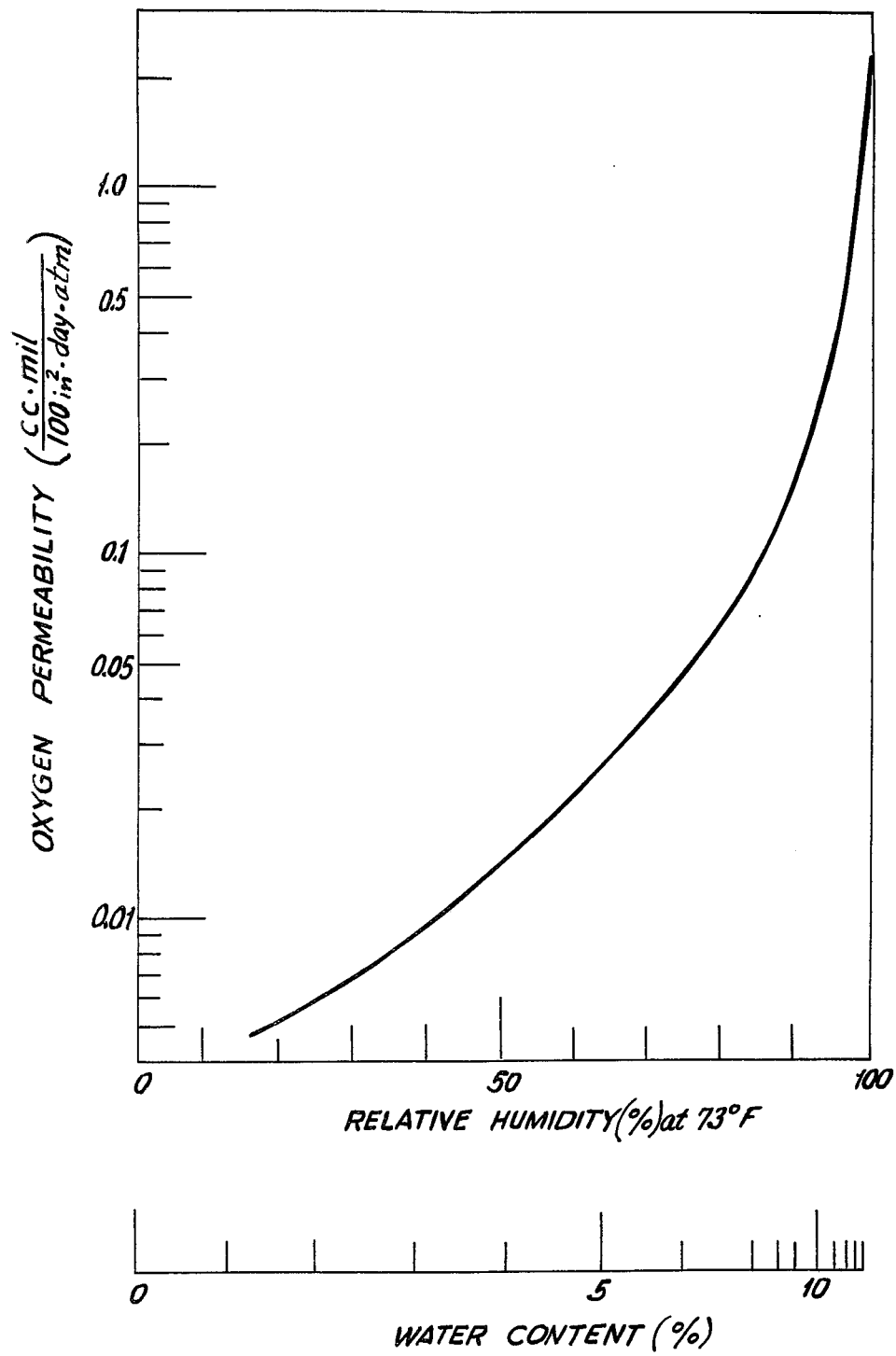
FIG. 1 is a plot of oxygen permeability as a function of water content for EVOH.

EVOH and PVOH are moisture sensitive polymers. The oxygen barrier quality of an EVOH or PVOH layer is degraded by the presence of moisture in the layer. FIG. 1 is a plot of oxygen permeability of EVOH as a function of moisture content. The oxygen permeability is presented in cubic centimeters per day for a film area of 100 square inches at a pressure gradient of one atmosphere $O_2$ per mil of film thickness.

$$\frac{cc \cdot mil}{100 \ in^2 \cdot day \cdot atm}$$

The moisture content is presented as the weight percentage of water in the EVOH and is also presented as "water activity". Water activity is most simply defined as the water vapor pressure exerted by a substance divided by the vapor pressure of pure water at the same temperature and pressure. When expressed as a percentage, water activity is often called "relative humidity". A strict thermodynamic definition of "water activity" is discussed in such standard texts as "Thermodynamics" by Lewis and Randall (1923). It should be noted that oxygen permeability is plotted on a logarithmic scale in FIG. 1. There is a tenfold increase in permeability between a water content of about 3 percent and 7 percent and over a hundredfold increase between about 3 percent and 12 percent. Thus, a moisture content in excess of about 7 percent causes rapid degradation of the oxygen barrier quality. Food packaging economics favor an oxygen permeability of 0.1 or less, in the above described units. The cost of EVOH dictates the use of thin layers in which very small quantities of water cause a significant increase in water activity. This causes the oxygen permeability to exceed desired limits. EVOH is hydrophilic and extracts moisture from the surroundings.

Figure 2:
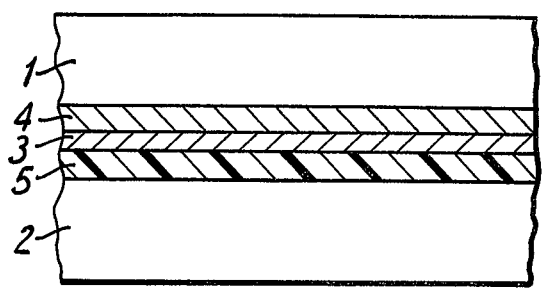
FIG. 2 is an enlarged cross-sectional view of a multi-layer polymeric structure suitable for food packaging.

To protect the EVOH layer from moisture, it is buried between inner and outer layers of moisture barrier polymers such as polyethylene, polypropylene, or blends of the two. FIG. 2 is an enlarged cross-sectional view of a typical multi-layer container wall. The polyolefin structural layers 1 and 2 are adhered to the EVOH oxygen barrier layer 3 by adhesive layers 4 and 5. The adhesive layers 4,5 may be a modified polyolefin such as those sold under the name Plexar by Chemplex Corp. of Rolling Meadows, Ill. Suitable EVOH polymeric materials having vinyl alcohol contents of approximately 70 mole percent are sold under the name EVAL by Kuraray Chemical Co., Ltd., and also by Nippon Goshei Co., Ltd. under the names GLD and GLE. Polyolefins are good moisture barriers at and below expectable normal ambient temperatures and thus serve to insulate the interior EVOH layer from moisture. However, at elevated temperatures polyolefins increasingly become more permeable to moisture. Many foods are retorted in the package or container to achieve commercial sterility. The ability to subject a filled food package to retort conditions of 250° F. or more for one half-hour or more in the presence of steam or water (under pressure) is a practical necessity. Retort conditions significantly increase the moisture permeability of polyolefins and allow moisture to enter the EVOH layer. Return of the package to room temperature restores the moisture impermeability of the polyolefin, thereby entrapping the moisture in the EVOH layer. The amount of moisture thus entrapped easily can exceed a water content of about 7 percent (water activity of about 0.9 at room temperature) thereby resulting in an oxygen barrier quality inadequate for many purposes.

Figure 3:
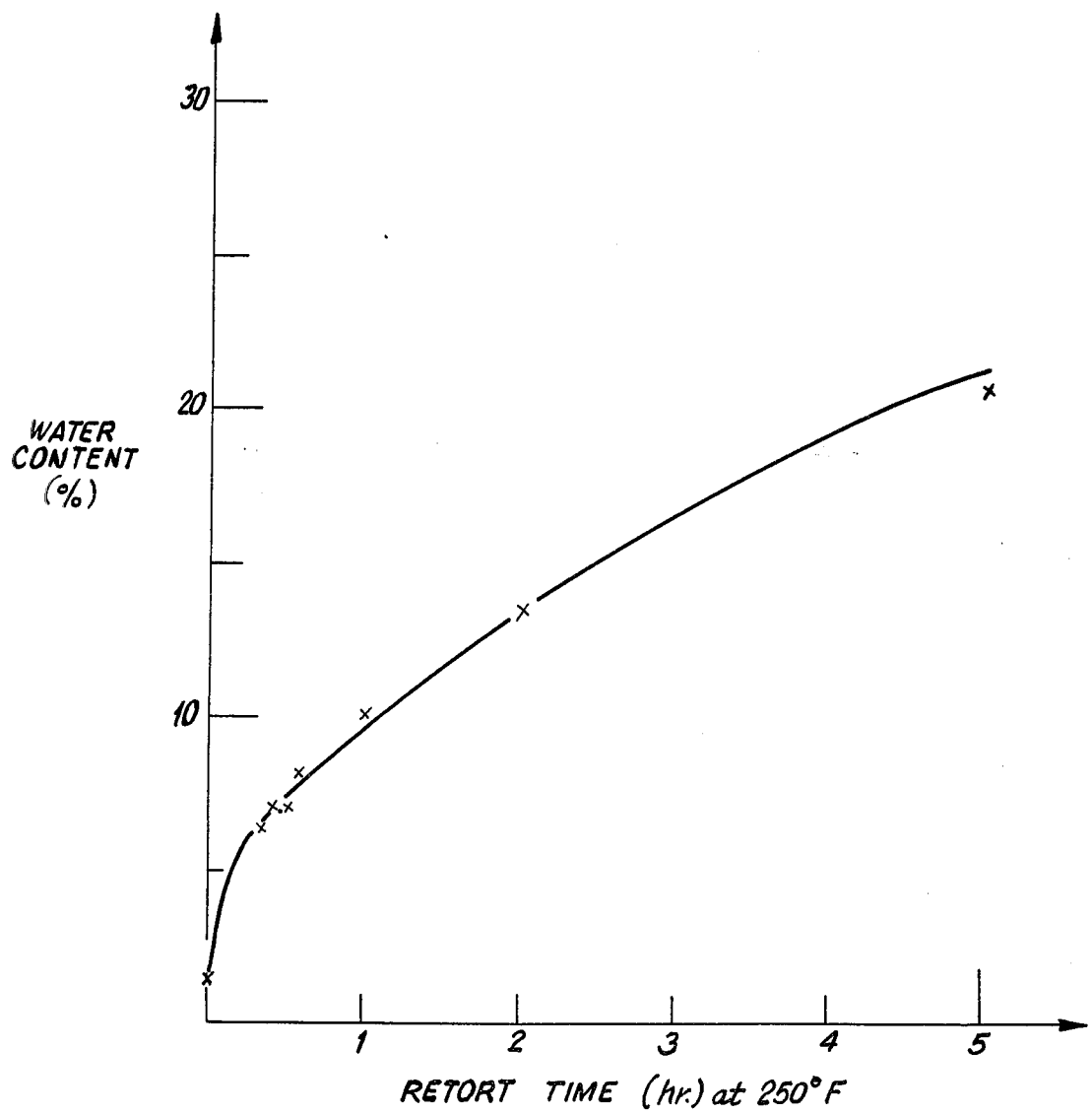
FIG. 3 is a plot of water content as a function of retort time for an EVOH layer in a multi-layer package.

FIG. 3 plots the moisture absorbed by an EVOH layer buried in polyolefin inner and outer layers of a multi-layer rigid container of can shape. The water content is plotted as a function of time in a retort at 250° F. It can be observed that at all retort times above less than one half-hour, the water content is in excess of that which provides an oxygen permeability less than 0.1.

Drying agents, sometimes called desiccants, extract water from their surroundings. We have determined that the incorporation of drying agents, including agents not conventionally recognized as such, in a multi-layer film structure will maintain an adequately low moisture content in a moisture sensitive layer. In particular, we have determined that the incorporation of drying agents in the adhesive layers 4,5 adjacent to the barrier layer 3 of EVOH will preserve the oxygen barrier quality of EVOH by maintaining the water activity of the EVOH at a level below 0.8 or 0.9 (which corresponds to a water content of between 6 and 7 percent) to thereby keep the oxygen permeability below about 0.1.

Figure 4:
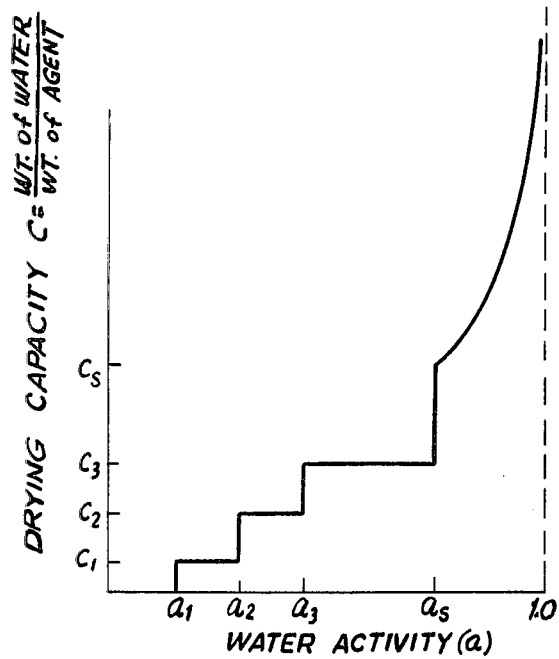
FIGS. 4–7 are plots of isotherms for various types of drying agents.

FIG. 4 is a generalized isotherm for hydrate forming drying agents such as sodium phosphate-di-basic and calcium chloride. The drying capacity (c, where c=wt. of water/wt. of agent) of the substance is plotted against the water activity (a) of the surroundings. When the surroundings are air, the water activity is usually expressed as relative humidity (R.H.). No water is taken up until the humidity or water activity reaches a value $a_1$ at which the first hydrate forms. In the case of calcium chloride the first hydrate occurs at less than 2 percent R.H. ($a<0.02$). Water is taken up until point $c_1$ which represents completion of the first hydrate. No further water is taken up until the humidity or water activity reaches the value $a_2$ where the second hydrate forms and takes up water to the point $c_2$. This process continues through as many hydrates as the substance forms at which point ($a_s$) the substance begins to dissolve and a saturated solution is formed. The saturated solution will then continue to take up water to the limit of saturation ($c_s$) and beyond.

Figure 5:
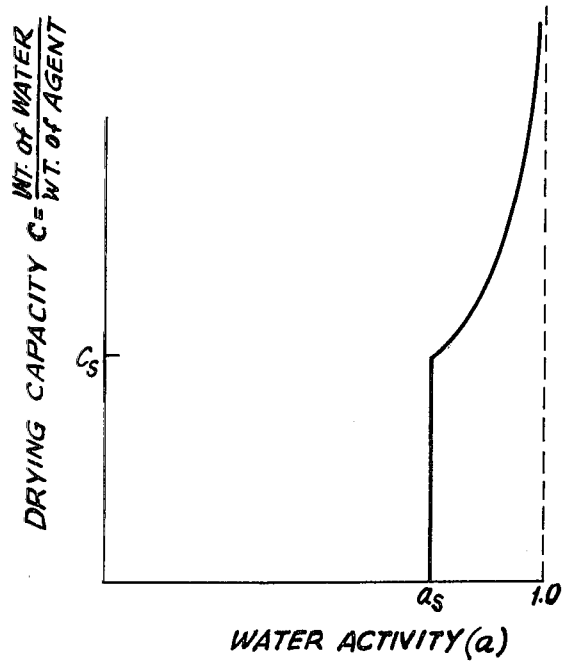

FIG. 5 represents an isotherm of a drying agent which forms no hydrates. Common salt (NaCl) is typical of this class. Common salt will absorb no water at a humidity below about 75 percent. When 75 percent R.H. is reached, a saturated solution is formed which continues to take up water.

Figure 6:
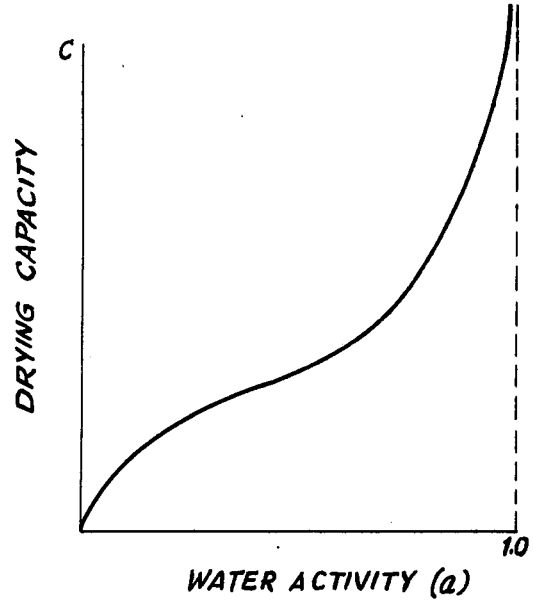

FIG. 6 represents an isotherm of a water soluble drying agent such as gelatin which absorbs water at all water activities. At high water activities it dissolves and the solution continues to take up water.

Figure 7:
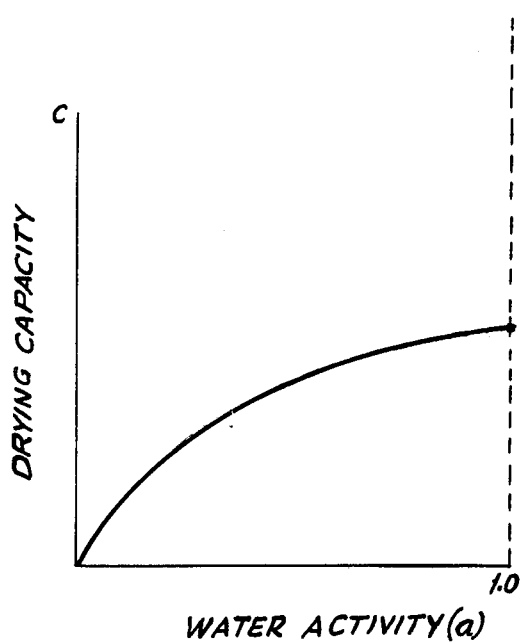

FIG. 7 represents an isotherm of a water insoluble drying agent such as bentonite clay or silica gel which absorbs water at all water activities. Since no solution is formed, further adsorption ceases when the intersticies are filled.

From the foregoing description of drying agents with reference to FIGS. 4 through 7, it can be observed that different materials act differently to extract water from their surroundings. Moreover, the absorption isotherm for a particular material depends upon temperature. Most available data are reported for room temperature. A particular material may act quite differently at elevated temperatures such as are encountered during retorting of foods. For example, although sodium phosphate-di-basic has three hydrates at room temperature, it forms none at 250° F.

Table I reports several drying agents which, at adequate loading, resulted in favorable oxygen permeabilities after at least a two hour retort at 250° F. The agents were incorporated in the adhesive layers 4 and 5 of a multi-layer structure. Prior to use, the agents were comminuted in a Waring Blendor and then screened. The agents were compounded by melt blending with the adhesive polymeric material. The permeability data for the drying agents are averages of several determinations. The EVOH used was GLD. The adhesive was Plexar III. The olefin was a high density polyethylene.

TABLE I

| Agent | Weight Percent of Agent in Adhesive | Thickness, mil EVOH | Adhesive | Olefin | Oxygen Permeability |
|---|---|---|---|---|---|
| none | 0 | 1.6 | 2.6 | 15 | 1.6–2.5 |
| $CaCl_2$ | 23.4 | 1.6 | 2.6 | 17 | <0.02 |
| NaCl | 19.5 | 1.7 | 2.4 | 14.7 | 0.08 |
| $NH_4Cl$ | 20.2 | 1.7 | 2.8 | 15 | 0.05 |
| $Na_2HPO_4$ | 20.7 | 1.6 | 2.6 | 15 | 0.03 |
| $Na_2HPO_4$* | 2.5 | 1.7 | 2.5 | 15 | 1.80 |
| $Na_2HPO_4$* | 10.5 | 1.7 | 2.5 | 15 | 0.02 |
| Sucrose | 40 | 1.8 | 3.0 | 14.6 | <0.02 |
| Sucrose | 22.5 | 1.8 | 2.8 | 15 | <0.02 |
| Sucrose | 5 | 1.8 | 2.5 | 15 | 0.20 |
| $K_2CO_3$ | 18.3 | 1.8 | 2.9 | 14.5 | <0.02 |
| $KAl(SO_4)_2$ | 24 | 1.6 | 2.3 | 14.7 | 0.02 |
| $MgSO_4$ | 21.7 | 1.6 | 2.6 | 14.4 | <0.02 |
| KBr** | 17.5 | 1.7 | 2.8 | 14.9 | 0.11 |
| $MgCl_2$ | 20 | 1.8 | 2.5 | 15 | <0.02 |
| $(NH_4)_2SO_4$ | 20.5 | 1.9 | 2.5 | 15 | 0.12 |
| $NaNO_3$ | 20 | 1.6 | 2.5 | 15 | <0.02 |
| $NH_4H_2PO_4$ | 25.2 | 1.6 | 2.7 | 14.7 | 0.11 |
| $NaCl + NH_4Cl$ | 10,10 | 1.7 | 2.7 | 15 | 0.03 |
| $Na_2HPO_4 + NH_4Cl$ | 10,10 | 1.9 | 2.5 | 15 | <0.02 |

*3 hr. retort at 250° F.
**2.25 hr. retort at 250° F.

Table II reports several other candidate materials which were not as effective as those in Table I. The structures were otherwise similar to those of Table I.

TABLE II

| Agent | Weight Percent Agent in Adhesive | Thickness, mil EVOH | Adhesive | Olefin | Oxygen Permeability |
|---|---|---|---|---|---|
| CaO | 15 | 1.6 | 2.8 | 14.8 | 0.84 |
| $KNO_3$ | 20.8 | 1.65 | 2.5 | 15 | 0.35 |
| $CaSO_4$ | 24.6 | 1.5 | 2.6 | 14.8 | 2.4 |
| molecular sieve (Linde 4A) | 20 | 1.6 | 2.7 | 14.6 | 1.35 |
| bentonite clay | 20 | 1.7 | 2.8 | 14.8 | 0.51 |
| $Na_2SO_4$ | 20.6 | 1.6 | 2.5 | 14.6 | 0.99 |

Some experimentation has been conducted with polyvinyl alcohol (PVOH). PVOH has a curve of oxygen permeability as a function of water activity which differs from that for EVOH (compare with FIG. 1 for EVOH). The oxygen permeability of PVOH increases rapidly at water activity above 0.6. Since glycerin is often used as a plasticizer in PVOH, and since glycerin affects that curve, drying agents should be selected which result in a water activity somewhat below 0.6. In a structure similar to those of Table I, 17 percent $K_2CO_3$ provided an oxygen permeability below 0.02, whereas PVOH alone had a permeability of 1.7 or higher.

A test was run using Dow Saranex brand multi-layer film including a 0.8 mil inner layer of Saran (vinylidine chloride-vinyl chloride copolymer) with and without retorting at 250° F. for 1.25 hours and with and without sucrose (the drying agent) in the adhesive layers. The outer layers were each 15 mil HDPE. The adhesive layer was 2.6 mils thick. The results are tabulated below:

TABLE III

|  | Oxygen Permeability | |
| --- | --- | --- |
|  | non-retorted | retorted |
| without sucrose | 0.23 | 0.80 |
| with sucrose | 0.20 | 0.23 |

From Table III, it can be seen that the inclusion of sucrose as the drying agent provided a permeability after retorting as low as before retorting. Saran is not as effective an oxygen barrier as is EVOH.

Desirable drying agents should have sufficient drying capacity (c) at the water activity above which EVOH loses its oxygen barrier quality. Potassium nitrate is an example of a material which has no drying capacity at a water activity below about 0.85 (see FIG. 1). Therefore, even the use of large quantities of these materials will not provide adequate barrier properties of the multi-layer structure. Further, desirable drying agents should have sufficient drying capacity to protect the EVOH at reasonable quantities or loadings of the agent. Molecular sieves, calcium sulphate (Drierite) and bentonite clay are examples of candidate materials which, at reasonable loadings, result in relatively high oxygen permeability. Still further, desirable drying agents generally should have more drying capacity at higher water activities than at lower water activities to avoid premature exhaustion. Calcium oxide is as active at 0.01 (water activity) as it is at 0.9 and therefore soon exhausts its drying capacity.

Sucrose at 5 percent and sodium phosphate-di-basic at 2.5 percent are examples of insufficient loading with agents which are effective at higher loadings (Table I).

Many sugars are effective drying agents for multilayer structures because they have high drying capacity at a water activity which preserves the oxygen barrier quality of EVOH. Some sugars, such as sucrose, galactose, glucose and maltose, are more effective after heating. For example, sucrose when heated to 350° F. for up to 40 minutes becomes effective. Such heating occurs during melt blending with the polymer.

Considerations in selection of drying agents include the ability to compound the drying agent with the polymer and to process the compound at the temperature dictated by the polymer. Calcium chloride, while very effective as a drying agent, is difficult to process because it normally contains at least the first hydrate which forms below 2 percent R.H. When the polymer is extruded or otherwise melt processed, the water of hydration is driven off and causes bubbles to form in the polymer.

The quantity of drying agent required is in part dictated by the need to have the drying agent still active after retorting. Too small a quantity may exhaust its drying capacity. Generally, drying agents are less expensive than the polymer with which they are compounded which encourages high loading of the polymer with agent. However, excessive loading may cause various problems such as interference with the adhesion of the polymer to the other layers.

Studies were made comparing identical rigid multi-layer polyolefin containers having a 2.0 mil EVOH buried layer where one group of containers was retorted and the other not. After the containers reached moisture equilibrium, the oxygen permeability was measured. The oxygen permeability of those having a history of retorting was higher. This leads to the conclusion that the properties of EVOH are not entirely restored by extracting moisture. Thus, it appears that it is more desirable to prevent the intrusion of moisture into the EVOH during retorting than to extract the moisture subsequently. It can be concluded that drying agents which are active under retort conditions have advantages. Potassium carbonate, sodium nitrate and ammonium chloride are examples of agents which are active during retorting.

The term "drying agent" includes mixtures of two or more agents and includes mixtures of agents in which one member is more active during retorting than the other(s). Some mixtures have demonstrated better performance than do the components of the mixture separately (see Table I).

Rigid containers comprising inner and outer layers of a blend of polypropylene and polyethylene, adhesive layers of Plexar (modified polyolefin) and an innermost barrier layer of EVOH were formed in the shape of cans and a metal end was double seamed on the open end by conventional canning techniques. The containers were retorted for 2 hours at 250° F. The containers were stored at room temperature with 100 percent R.H. inside and 75 percent outside. Those containers having drying agents in the adhesive layer showed superior oxygen barrier after storage. Drying agents are desirable even for containers not subject to retorting. Containers without drying agents, when stored under the above conditions, show a threefold increase in permeability after 100 days, whereas those having drying agents show no increase.

The structural layers outside the barrier and adhesive layers serve as moisture barriers. Where the structural layers are relatively thick (polyolefin layer about 15 mils) the rate of moisture transmission is low, lessening the demands made upon the drying agent. Consequently, there is a wide range of adequate drying agent materials.

The thinner structural layers used in films, pouches, or bags transmit more moisture and, therefore, impose greater demands upon the drying agent. For non-retorted thin packages, the drying agents should have a relatively high drying capacity in the range from about 0.5 to 0.8 water activity. Sodium chloride, sodium phosphate-di-basic and ammonium chloride are good choices. For thin retorted packages, a drying agent which is relatively inactive under retort conditions, but has high drying capacity subsequent to retorting is desired. Sodium phosphate-di-basic is effective because it exhibits no hydrates at 250° F. but forms hydrates at room temperature. (See FIG. 4). Although the drying agents have been employed in the adhesive layers adjacent to the barrier layer, it is apparent that the layer containing the drying agent can be separated from the barrier layer by an intervening layer if that intervening layer is thin enough to allow moisture passage, or if that layer is a moisture permeable material such as nylon.

While the foregoing specification is written in terms of multi-layer polymeric structures for food packaging, it is apparent that the invention is applicable to multi-layer structures for other purposes where maintenance of barrier properties of a moisture sensitive layer is important.

Experiments have shown that barrier polymers other than EVOH, such as polyvinyl alcohol and Saran, when subjected to retorting, benefit from the presence of drying agents.

We claim:

1. In a multi-layer polymeric structure having an interior layer of a moisture sensitive oxygen barrier polymer, the improvement which comprises the incorporation of a drying agent entrapped in a layer of the structure to protect said moisture sensitive layer.

2. In a multi-layer polymeric structure having an interior layer of a moisture sensitive oxygen barrier polymer, the improvement which comprises the incorporation of a drying agent entrapped in a layer of the structure which is proximate to said moisture sensitive layer.

3. The multi-layer structure of claim 1 wherein the drying agent is calcium chloride.

4. The multi-layer structure of claim 1 wherein the drying agent is sodium chloride.

5. The multi-layer structure of claim 1 wherein the drying agent is sodium phosphate-di-basic.

6. The multi-layer structure of claim 1 wherein the drying agent is ammonium chloride.

7. The multi-layer structure of claim 1 wherein the drying agent is sucrose.

8. The multi-layer structure of claim 1 wherein the drying agent is potassium carbonate.

9. The multi-layer structure of claim 1 wherein the drying agent is potassium aluminum sulphate.

10. The multi-layer structure of claim 1 wherein the drying agent is magnesium sulphate.

11. The multi-layer structure of claim 1 wherein the drying agent is magnesium chloride.

12. The multi-layer structure of claim 1 wherein the drying agent is sodium nitrate.

13. The multi-layer structure of claim 1 wherein the drying agent is ammonium sulphate.

14. The multi-layer structure of claim 1 wherein the drying agent is ammonium phosphate-monobasic.

15. The multi-layer structure of claim 1 wherein the drying agent is potassium bromide.

16. A multi-layer polymeric structure comprising an interior layer of a moisture sensitive oxygen barrier polymer, exterior layers of a structural polymer, and intermediate layers of an adherent polymer between the interior and exterior layers, the intermediate layers containing a drying agent.

17. A multi-layer polymeric structure comprising an interior layer of a moisture sensitive oxygen barrier polymer, exterior layers of polyolefin, and intermediate layers of an adherent modified polyolefin, the modified polyolefin containing a drying agent.

18. A multi-layer structure comprising an interior oxygen barrier layer of ethylene-vinyl alcohol, exterior layers of polyolefin, and intermediate layers of adherent modified polyolefin containing a drying agent.

19. The multi-layer structure of claim 18 wherein the drying agent is calcium chloride.

20. The multi-layer structure of claim 18 wherein the drying agent is sodium chloride.

21. The multi-layer structure of claim 18 wherein the drying agent is ammonium chloride.

22. The multi-layer structure of claim 18 wherein the drying agent is sodium phosphate-di-basic.

23. The multi-layer structure of claim 18 wherein the drying agent is sucrose.

24. The multi-layer structure of claim 18 wherein the drying agent is potassium carbonate.

25. The multi-layer structure of claim 18 wherein the drying agent is potassium aluminum sulphate.

26. The multi-layer structure of claim 18 wherein the drying agent is magnesium sulphate.

27. The multi-layer structure of claim 18 wherein the drying agent is magnesium chloride.

28. The multi-layer structure of claim 18 wherein the drying agent is sodium nitrate.

29. The multi-layer structure of claim 18 wherein the drying agent is ammonium phosphate-monobasic.

30. The multi-layer structure of claim 18 wherein the drying agent is potassium bromide.

31. The multi-layer structure of claim 18 wherein the drying agent is ammonium sulphate.

32. In a multi-layer polymeric structure having an interior layer of a moisture sensitive oxygen barrier polymer, the improvement which comprises the incorporation of a drying agent entrapped in a layer of the structure to protect the oxygen barrier quality of the structure.

33. The multi-layer structure of claim 32 wherein the drying agent is calcium chloride.

34. The multi-layer structure of claim 32 wherein the drying agent is sodium chloride.

35. The multi-layer structure of claim 32 wherein the drying agent is sodium phosphate-di-basic.

36. The multi-layer structure of claim 32 wherein the drying agent is ammonium chloride.

37. The multi-layer structure of claim 32 wherein the drying agent is sucrose.

38. The multi-layer structure of claim 32 wherein the drying agent is potassium carbonate.

39. The multi-layer structure of claim 32 wherein the drying agent is potassium aluminum sulphate.

40. The multi-layer structure of claim 32 wherein the drying agent is magnesium sulphate.

41. The multi-layer structure of claim 32 wherein the drying agent is magnesium chloride.

42. The multi-layer structure of claim 32 wherein the drying agent is sodium nitrate.

43. The multi-layer structure of claim 32 wherein the drying agent is ammonium sulphate.

44. The multi-layer structure of claim 32 wherein the drying agent is ammonium phosphate-monobasic.

45. The multi-layer structure of claim 32 wherein the drying agent is potassium bromide.

46. The multi-layer structure of claim 1, 2, 16, 17, 18, or 32, wherein the drying agent has a high drying capacity at a water activity below about 0.85 and wherein the drying capacity at about 0.85 water activity is greater than the drying capacity at about 0.1 water activity.

47. A multi-layer polymeric structure comprising an interior layer of a moisture sensitive oxygen barrier polymer selected from the group consisting of ethylene-vinyl alcohol and polyvinyl alcohol, and a layer in which is incorporated a drying agent and which is proximate to said moisture sensitive layer.

48. The multi-layer structure of claim 47 wherein the drying agent is calcium chloride.

49. The multi-layer structure of claim 47 wherein the drying agent is sodium chloride.

50. The multi-layer structure of claim 47 wherein the drying agent is sodium phosphate-di-basic.

51. The multi-layer structure of claim 47 wherein the drying agent is ammonium chloride.

52. The multi-layer structure of claim 47 wherein the drying agent is sucrose.

53. The multi-layer structurer of claim 47 wherein the drying agent is potassium carbonate.

54. The multi-layer structure of claim 47 wherein the drying agent is potassium aluminum sulphate.

55. The multi-layer structure of claim 47 wherein the drying agent is magnesium sulphate.

56. The multi-layer structure of claim 47 wherein the drying agent is magnesium chloride.

57. The multi-layer structure of claim 47 wherein the drying agent is sodium nitrate.

58. The multi-layer structure of claim 47 wherein the drying agent is ammonium sulphate.

59. The multi-layer structure of claim 47 wherein the drying agent is ammonium phosphate-monobasic.

60. The multi-layer structure of claim 47 wherein the drying agent is potassium bromide.

61. A multi-layer polymeric structure comprising an interior layer of a moisture sensitive oxygen barrier polymer, exterior layers of a structural polymer, and an intermediate layer of an adherent polymer between the interior layer and at least one of the exterior layers, the intermediate layer containing a drying agent.

62. A multi-layer polymeric structure comprising an interior layer of a moisture sensitive oxygen barrier polymer selected from the group consisting of ethylene-vinyl alcohol and polyvinyl alcohol, and a layer in which is incorporated a drying agent and which is not proximate to said moisture sensitive layer.

63. The multi-layer structure of claim 62 wherein the drying agent is calcium chloride.

64. The multi-layer structure of claim 62 wherein the drying agent is sodium chloride.

65. The multi-layer structure of claim 62 wherein the drying agent is sodium phosphate-di-basic.

66. The multi-layer structure of claim 62 wherein the drying agent is ammonium chloride.

67. The multi-layer structure of claim 62 wherein the drying agent is sucrose.

68. The multi-layer structure of claim 62 wherein the drying agent is potassium carbonate.

69. The multi-layer structure of claim 62 wherein the drying agent is potassium aluminum sulphate.

70. The multi-layer structure of claim 62 wherein the drying agent is magnesium sulphate.

71. The multi-layer structure of claim 62 wherein the drying agent is magnesium chloride.

72. The multi-layer structure of claim 62 wherein the drying agent is sodium nitrate.

73. The multi-layer structure of claim 62 wherein the drying agent is ammonium sulphate.

74. The multi-layer structure of claim 62 wherein the drying agent is ammonium phosphate-monobasic.

75. The multi-layer structure of claim 62 wherein the drying agent is potassium bromide.

* * * * *